United States Patent
Karimi et al.

(10) Patent No.: US 9,413,601 B2
(45) Date of Patent: Aug. 9, 2016

(54) CHANNEL REUSE AMONG COMMUNICATION NETWORKS SHARING A COMMUNICATION CHANNEL

(71) Applicant: QUALCOMM Incorporated, San Diego, CA (US)

(72) Inventors: Joubin Karimi, Ottawa (CA); Ehab Tahir, Mississauga (CA); Brian James Langlais, Almonte (CA); John Fraser Chappel, Mississauga (CA); Son Binh Cam, Scarborough (CA); Richard David Roze, Toronto (CA); Gregory Allen Magin, Ocala, FL (US); Celestino A. Corral, Ocala, FL (US); Syed Adil Hussain, Cupertino (CA); Keith Riley, Mississauga (CA)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 13/838,678

(22) Filed: Mar. 15, 2013

(65) Prior Publication Data
US 2014/0092774 A1    Apr. 3, 2014

Related U.S. Application Data

(60) Provisional application No. 61/707,747, filed on Sep. 28, 2012.

(51) Int. Cl.
*H04L 12/24* (2006.01)
*H04B 3/54* (2006.01)
(Continued)

(52) U.S. Cl.
CPC .............. *H04L 41/0803* (2013.01); *H04B 1/69* (2013.01); *H04B 3/544* (2013.01); *H04J 13/18* (2013.01); *H04B 2203/5404* (2013.01); *H04J 13/004* (2013.01)

(58) Field of Classification Search
None
See application file for complete search history.

(56) References Cited

U.S. PATENT DOCUMENTS 6,134,215 A    10/2000   Agrawal et al.
6,484,082 B1 *  11/2002   Millsap ............... H04L 12/4035
                                                           701/32.7
(Continued)

FOREIGN PATENT DOCUMENTS

CN    101873195    10/2010
CN     1988402     4/2011
(Continued)

OTHER PUBLICATIONS

"PCT Written Opinion PCT/US2013/062027, mailed Sep. 5, 2014", Sep. 5, 2014, 7 pages.
(Continued)

*Primary Examiner* — Charles C Jiang
*Assistant Examiner* — George Atkins, Jr.
(74) *Attorney, Agent, or Firm* — DeLizio Law, PLLC

(57) ABSTRACT

A first network device determines whether a first reference code included in at least a first transmission on a communication channel is associated with a code configured in the first network device. The communication channel is shared among a plurality of communication networks and the first reference code is associated with a first communication network of the plurality of communication networks. The first network device joins the first communication network associated with the first reference code in response to determining the first reference code is associated with the code configured in the first network device. The first network device communicates with a second network device in the first communication network using the code configured in the first network device.

30 Claims, 7 Drawing Sheets

(51) Int. Cl.
*H04B 1/69* (2011.01)
*H04J 13/18* (2011.01)
*H04J 13/00* (2011.01)

(56) References Cited

U.S. PATENT DOCUMENTS

| | | | |
|---|---|---|---|
| 7,154,846 | B2 | 12/2006 | Chen et al. |
| 7,317,732 | B2 | 1/2008 | Mills et al. |
| 7,680,090 | B2 | 3/2010 | Welborn |
| 7,760,699 | B1 | 7/2010 | Malik |
| 7,856,008 | B2 * | 12/2010 | Ayyagari ............... H04B 3/542 370/350 |
| 8,165,172 | B2 | 4/2012 | Razazian et al. |
| 8,995,247 | B2 | 3/2015 | Chappel et al. |
| 2004/0113757 | A1 * | 6/2004 | White ..................... H04B 3/56 702/62 |
| 2006/0072604 | A1 | 4/2006 | Sutivong et al. |
| 2008/0130770 | A1 | 6/2008 | Khandekar et al. |
| 2008/0186935 | A1 | 8/2008 | Ling et al. |
| 2009/0054033 | A1 * | 2/2009 | Pratt, Jr. ................ G01D 21/00 455/410 |
| 2009/0103642 | A1 * | 4/2009 | Galli ....................... H04B 3/54 375/260 |
| 2009/0175158 | A1 * | 7/2009 | Shamburger .......... H04J 13/004 370/203 |
| 2009/0175321 | A1 | 7/2009 | Sasaki et al. |
| 2009/0252200 | A1 | 10/2009 | Dohler et al. |
| 2009/0268752 | A1 | 10/2009 | Miyazaki et al. |
| 2010/0195503 | A1 * | 8/2010 | Raleigh ............. H04W 28/0268 370/235 |
| 2010/0272192 | A1 | 10/2010 | Varadarajan et al. |
| 2011/0164530 | A1 * | 7/2011 | Krishnaswamy ... H04W 76/023 370/254 |
| 2012/0093198 | A1 * | 4/2012 | Dabak .................... H04B 3/542 375/139 |
| 2012/0106517 | A1 * | 5/2012 | Charbit ................. H04W 72/04 370/336 |
| 2012/0275526 | A1 * | 11/2012 | Hughes .................. H04B 3/542 375/257 |
| 2012/0314744 | A1 | 12/2012 | Vedantham et al. |
| 2013/0268920 | A1 * | 10/2013 | Ursal ....................... G06F 8/60 717/131 |
| 2014/0192912 | A1 | 7/2014 | Chappel et al. |

FOREIGN PATENT DOCUMENTS

| | | |
|---|---|---|
| EP | 1079561 | 2/2001 |
| EP | 1158718 | 11/2001 |
| KR | 20000061118 | 10/2000 |
| WO | 9859429 | 12/1998 |
| WO | 2014052660 | 4/2014 |

OTHER PUBLICATIONS

PCT Application No. PCT/2013/062027 International Search Report and Written Opinion, Mar. 18, 2014, 13 pages.
PCT Application No. PCT/2013/062027 Partial International Search Report (Annex to PCT/ISA/206), Jan. 24, 2014, 5 pages.
U.S. Appl. No. 13/735,966 Office Action, Jun. 23, 2014, 7 Pages.
Co-pending U.S. Appl. No. 13/735,966, filed Jan. 7, 2013, 40 pages.
"PCT Application No. PCT/US2013/062027 International Preliminary Report on Patentability", Oct. 16, 2014, 9 pages.

* cited by examiner

CHANNEL REUSE AMONG COMMUNICATION NETWORKS SHARING A COMMUNICATION CHANNEL

RELATED APPLICATIONS

This application claims the priority benefit of U.S. Provisional Application Ser. No. 61/707,747 filed Sep. 28, 2012.

BACKGROUND

Embodiments of the inventive subject matter generally relate to the field of communication networks, and, more particularly, to enabling channel reuse among communication networks sharing a communication channel.

Communication networks (e.g., Powerline Communication (PLC) networks, wireless networks, etc.) can utilize a communication channel or medium which is shared between multiple networks. When a shared communication channel is utilized, the bandwidth available to a communication network may be affected by neighboring communication networks which share the communication channel. In communication networks such as PLC networks, synchronization and frame information in a network packet are fairly robust to ensure reliable delivery of network packets. However, this robustness can reduce channel reuse as devices in a first communication network may be able to detect and decode signals from devices in a second communication network (even with reasonable amount of isolation between the two PLC networks). In techniques such as Carrier Sense Multiple Access (CSMA), network devices verify the absence of network traffic before transmitting on a shared communication channel. When implementing CSMA, detection of frames from the second communication network can cause devices in the first communication network to back-off and yield the communication channel to a transmission from the second communication network. Similarly, detection of frames from the first communication network can cause devices in the second communication network to back-off and yield the communication channel to the current transmission from the first communication network. Such situations result in the available bandwidth on the communication channel being shared between the first and second communication networks, which can reduce channel reuse among the networks.

SUMMARY

Various embodiments are disclosed for enabling channel reuse among communication networks sharing a common communication channel. In one embodiment, a first device determines whether a first reference code included in a first transmission on the communication channel is associated with a code configured in the first network device. The communication channel is shared among a plurality of communication networks. The first reference code is associated with a first communication network of the plurality of communication networks. The first network device joins the first communication network associated with the first reference code in response to determining the first reference code is associated with the code configured in the first network device. The first network device then initiates communications with a second network device in the first communication network using the code configured in the first network device.

DESCRIPTION OF EMBODIMENT(S)

Figure 1:
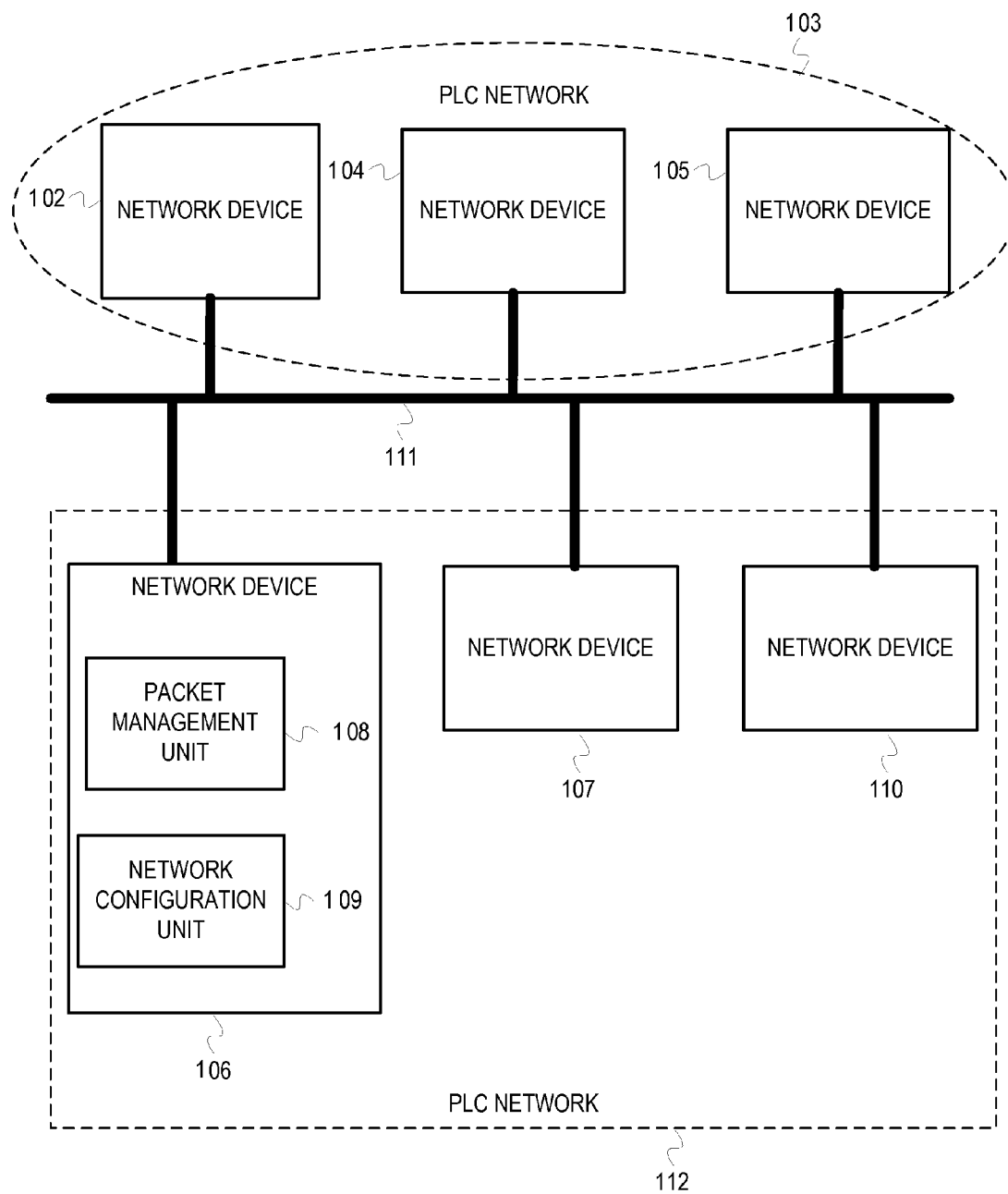
FIG. 1 depicts an example conceptual diagram of network devices in multiple communication networks sharing a communication channel or medium.

The description that follows includes exemplary systems, methods, techniques, instruction sequences and computer program products that embody techniques of the present inventive subject matter. However, it is understood that the described embodiments may be practiced without these specific details. For instance, although examples refer to enabling channel reuse among powerline communication networks sharing a powerline communication medium, embodiments are not so limited. In other embodiments, communication networks may be other types of communication networks (e.g., WLAN, Broadband Wireless Access, etc.) which utilize orthogonal frequency division multiplexing (OFDM). In other instances, well-known instruction instances, protocols, structures and techniques have not been shown in detail in order not to obfuscate the description.

Various embodiments are disclosed for utilizing orthogonal preambles to enable channel reuse of a communication channel (or a communication medium) shared by two or more communication networks which utilize OFDM. Channel reuse of the communication channel can be accomplished among network devices sharing the communication channel by using orthogonal preambles for each of the communication networks. The preambles can include a distinct orthogonal reference symbol (or orthocode), which can render the preambles of different communication networks orthogonal to each other. A first network device in the first communication network can be configured with a first orthocode associated with the first communication network. In one example, network packets transmitted from the first network device can include the first orthocode (corresponding to the first communication network). The first network device in the first communication network can also detect network packets transmitted from other network devices in the first communication network based on the first orthocode, as will be further described below.

In some embodiments, the first network device can join the first communication network based on the first orthocode configured in the network device. The network device can scan for transmissions from multiple communication networks on a shared communication channel. The network device can identify a transmission from a communication network having a reference orthocode that is associated with (e.g., correlates with) the first orthocode configured in the network device, and the network device may then join the communication network. After joining the communication network, when the network device is ready to transmit a network packet, the network device can configure the preamble of the network packet with the first orthocode associated with the first communication network. Also, after joining the communication network, the network device may scan for transmissions from other network devices sharing the communication channel. The network device may determine whether a reference orthocode in a network packet of a transmission is associated with the first orthocode configured in the network device. If the reference orthocode in the network packet is associated with (e.g., correlates with) the first orthocode configured in the network device, the network device can process the network packet. If the reference orthocode in the network packet of the transmission is not associated with (e.g., does not correlate with) the first orthocode configured in the network device, the network device can discard the network packet as noise.

FIG. 1 depicts an example conceptual diagram of network devices in multiple communication networks sharing a communication channel or medium. FIG. 1 includes a PLC network 103 having network devices 102, 104 and 105, a communication channel 111 (e.g., an electrical wire, etc.), and a PLC network 112 having network devices 106, 107 and 110. The communication channel 111 is shared between the network devices 102, 104 and 105 of the PLC network 103 and the network devices 106, 107 and 110 of the PLC network 112. Transmissions on the communication channel 111 include network packets (e.g., PLC network packet, etc.) of the respective communication network. The network devices 102, 104, 105, 106, 107 and 110 may be PLC devices (e.g., a PLC modem, a PLC adaptor, etc.), or electrical/electronic devices (e.g., television, computer, smart appliances, etc.) having PLC capabilities. Although FIG. 1 depicts multiple communication networks as PLC networks, it is noted that the multiple communication networks may be any communication network which share a communication channel and utilize OFDM. For example, the PLC networks 112 and 103 may instead be based on Ethernet over coax, WLANs (Wireless Local Area Networks), etc. Accordingly, the communication channel 111 may be a power line, a coaxial cable, a wireless communication channel, etc.

In one implementation, the network device 106 includes a packet management unit 108 and a network configuration unit 109. The network device 106 can join a PLC network (e.g., the PLC network 112 in FIG. 1) using the network configuration unit 109 based on an orthogonal code or orthocode (also referred to as "code") configured in the network device 106. For example, when the code configured in the network device 106 corresponds to a code associated with the PLC network 112, the network device 106 can join the PLC network 112. The code configured in the network device 106 may be a code stored in a memory of the network device 106. After joining the PLC network, the packet management unit 108 can configure preambles of network packets with the code stored in the network device 106 for transmission in the communication channel 111. The packet management unit 108 can also scan for transmissions from other network devices on the communication channel 111. The packet management unit 108 can detect and process network packets having a reference code associated with the code configured in the network device 106, as will be further described below. For simplification, FIG. 1 only depicts the network device 106 having the packet management unit 108 and the network configuration unit 109, however it is noted that the network devices 107 and 110 in the PLC network 112 and the network devices 102, 104 and 105 in the PLC network 103 may also implement similar packet management and network configuration units.

FIG. 1 depicts the PLC networks 103 and 112 as neighboring networks, and network devices in the PLC networks 103 and 112 share the communication channel 111 for transmitting and receiving network packets. For example, the network packets transmitted by the network devices of the PLC network 103 include a preamble having an orthocode associated with the PLC network 103, and the network packets transmitted by the network devices of the PLC network 112 include a preamble having a different orthocode associated with the PLC network 112. In some embodiments, the orthocode associated with the PLC network 103 may be a polyphase code which has a strong auto-correlation function, and a weak cross correlation function with a polyphase code associated with the PLC network 112. Similarly, the polyphase code associated with the PLC network 112 has a strong auto-correlation function and a weak cross correlation function with the polyphase code associated with the PLC network 103. Thus, the polyphase code associated with the PLC network 103 renders a preamble of a network packet transmitted by a network device (i.e., the network device 106, 107 or 110) in the PLC network 112 orthogonal to a preamble of a network packet transmitted by a network device (i.e., the network device 102, 104 or 105) in the PLC network 103. Hence, the network packet transmitted by the network device in the PLC network 103 appears as noise to the network device in the PLC network 112. Similarly, a network packet transmitted by a network device in the PLC network 112 appears as noise to a network device in the PLC network 103.

In some embodiments, a network device may determine which PLC network to join based on a code configured in the network device. For example, the network configuration unit 109 can scan for transmissions from at least the PLC networks 103 and 112 on the communication channel 111. The network configuration unit 109 may determine that a network packet of a transmission includes a reference code which is associated with the code configured in the network device 106. For example, the network configuration unit 109 determines that a network packet of a transmission corresponding to the PLC network 112 includes a reference code in its preamble which has a strong correlation with the code configured in the network device 106. The network device 106 can then join the PLC network 112 using the network configuration unit 109. Once the network device 106 joins the PLC network 112, the network device 106 may only receive and decode transmissions from network devices in the PLC network 112 over the communication channel 111. Transmissions corresponding to other networks (e.g., the PLC network 103) appear as noise to the network device 106.

In some embodiments, once the network device 106 joins the PLC network 112, the packet management unit 108 can configure preambles of network packets that are transmitted by the network device 106 on the communication channel 111. For example, the packet management unit 108 may insert the code (i.e., the code corresponding to the PLC network 112) as a reference code in the preamble of each network packet that is transmitted on the communication channel 111. Also, to receive network packets, the packet management unit 108 can scan transmissions on the communication channel 111. The packet management unit 108 can detect one or more network packets having a reference code associated with the code configured in the network device 106 (i.e., the code corresponding to the PLC network 112). The packet management unit 108 can then forward the network packets for processing to one or more processing components (e.g., a network packet buffer, a packet processing unit, etc.) of the network device 106.

In other embodiments, in addition to allowing channel reuse among network devices of the neighboring PLC networks 103 and 112, the packet management unit 108 and the network configuration unit 109 may implement additional techniques that allow channel reuse among network devices within the same PLC network (e.g., PLC network 112). For example, the network configuration unit 109 and the packet management unit 108 in the network device 106 (and similar units in the other network devices of the PLC networks 112, such as the network device 107) may allow a high priority communication to be established between two or more network devices of a communication network. In one implementation, as will be further described below with reference to FIG. 6, a high priority communication between a first network device and a second network device of the PLC network 112 can be temporarily established using a separate code. Channel reuse among network devices within the PLC network 112 may allow increasing the capacity of the communication channel 111 without physically increasing the capacity of the communication channel 111. For example, capacity of the communication channel 111 can be increased without adding new electrical wires when a separate code is utilized for communication amongst certain network devices. It is also noted that channel reuse within a communication network may ensure guaranteed delivery of high priority traffic between two or more network devices.

Figure 2:
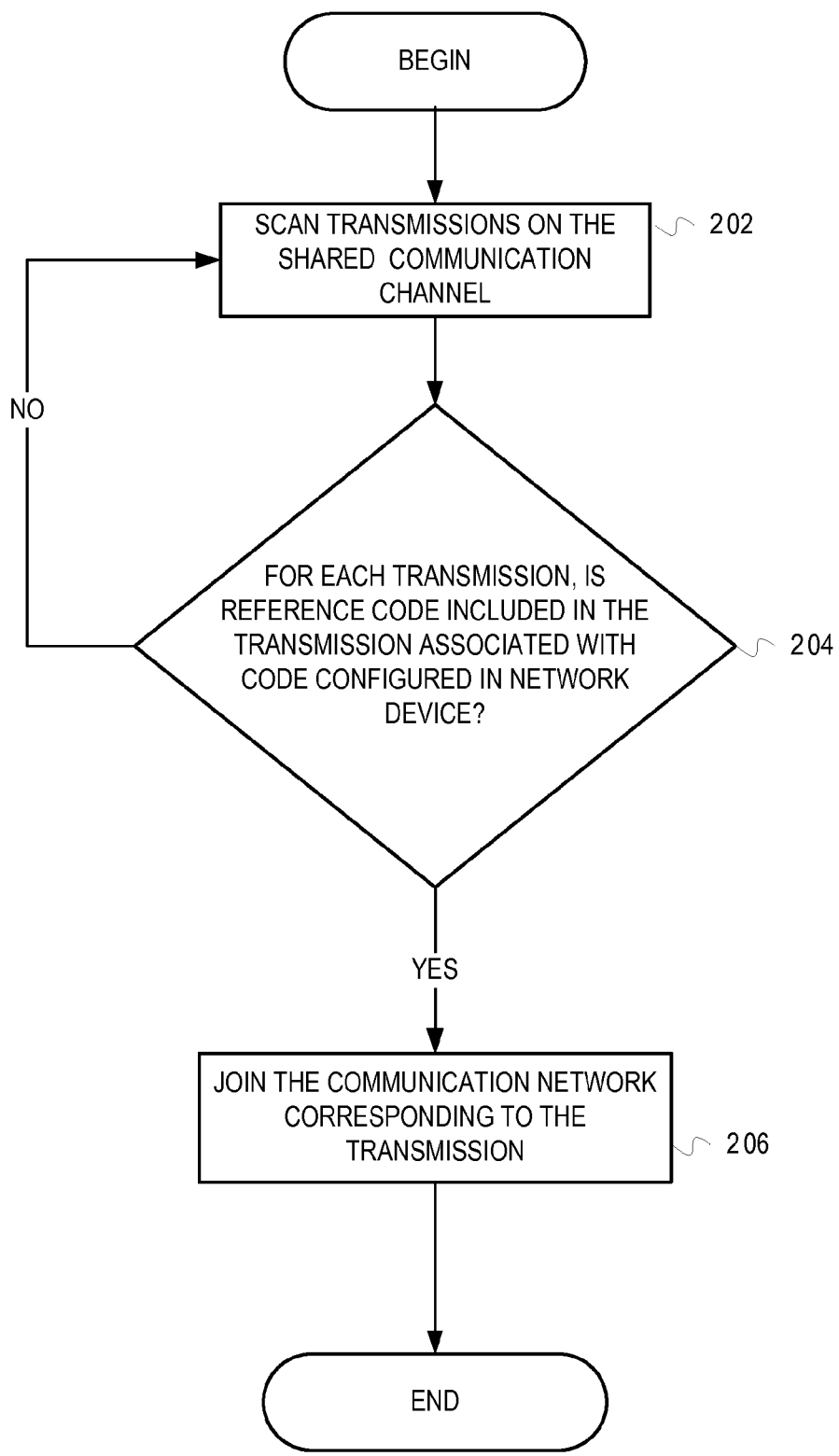
FIG. 2 illustrates a flow diagram of example operations for a network device to join a communication network via a shared communication channel when a reference code is preconfigured in the network device.

FIG. 2 illustrates a flow diagram of example operations for a network device to join a communication network via a shared communication channel when a reference code is pre-configured in the network device.

At block 202, transmissions on the shared communication channel are scanned by the network device. In one implementation, the network configuration unit 109 of the network device 106 (e.g., shown in FIG. 1) may scan the transmissions on the communication channel 111. For example, the network configuration unit 109 can monitor the communication channel 111 and attempt to detect network packets transmitted on the communication channel 111. The flow continues to block 204.

At block 204, for each transmission, the network device determines whether a reference code (i.e., a reference orthocode) included in the transmission is associated with a code (i.e., an orthocode) configured in the network device. In one implementation, the code in the network device 106 may be pre-configured (e.g., configured as a factory setting, etc.). In other implementations, the code in the network device 106 may be manually configured by a network administrator or user. Each transmission scanned at block 202 may include one or more network packets. Each of the network packets includes a preamble, and the preamble may include a reference code. The network configuration unit 109 can determine whether the reference code included in a preamble of a network packet is associated with the code configured in the network device 106. For example, the network configuration unit 109 computes a correlation of the reference code in the network packet (i.e., the network packet identified at block 202) with the code configured in the network device 106. When the correlation indicates an association (e.g., the result of correlation is above a pre-defined threshold), the network configuration unit 109 can determine that the reference code is associated with the code configured in the network device 106. In one example, the correlation indicates an association when the result of the correlation is above 0.95 (e.g., between 0.95 and 1). In another example, the correlation indicates an association when the result of the correlation is above 0.90 (e.g., between 0.90 and 1). When the correlation does not indicate an association (e.g., the result of correlation is below a pre-defined threshold), the network configuration unit 109 can determine that the reference code is not associated with the code configured in the network device 106. In one example, the correlation does not indicate an association when the result of the correlation is below 0.90. In another example, the correlation does not indicate an association when the result of the correlation is below 0.85. If the reference code is associated with (e.g., correlates with) the code configured in the network device 106, control flows to block 206. If the reference code is not associated with (e.g., does not correlate with) the code configured in the network device 106, control loops back to block 202.

At block 206, the network device joins the communication network corresponding to the transmission. In one implementation, the network configuration unit 109 of the network device 106 may join the communication network corresponding to the transmission. For example, once the network configuration unit 109 determines that the reference code included in the transmission (from one of the network devices in the PLC network 112) is associated with the code configured in the network device 106, the network configuration unit 109 joins the PLC network 112. The network configuration unit 109 may exchange one or more messages with a network device (e.g., a central coordinator) in the PLC network 112 to receive authentication information and join the PLC network 112. For example, the network configuration unit 109 may send a device identifier of the network device 106 to the central coordinator and request for a network key of the PLC network 112 from the central coordinator.

Figure 3:
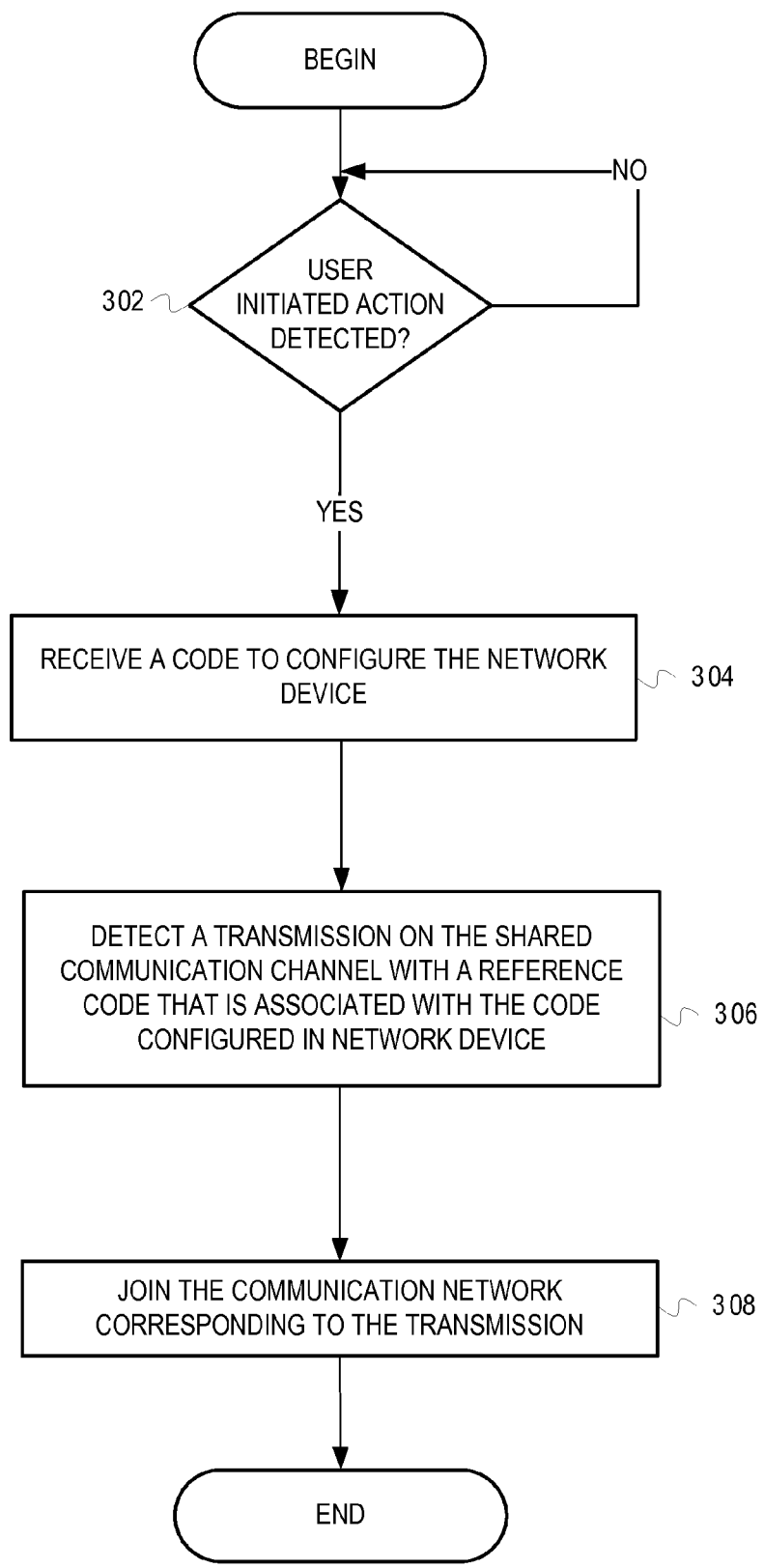
FIG. 3 illustrates a flow diagram of example operations for a network device to join a communication network via a shared communication channel when the network device receives a code from another network device.

FIG. 3 illustrates a flow diagram of example operations for a network device to join a communication network via a shared communication channel when the network device receives a code from another network device. For example, when a code is not configured in a network device, the network device can dynamically receive the code based on a push button input from a user or other user-initiated action, as will be further described below.

At block 302, it is determined whether a user-initiated action from a user is detected at the network device. In one implementation, the network configuration unit 109 of the network device 106 (e.g., shown in FIG. 1) can determine whether a push button input from a user is received. For example, the network configuration unit 109 determines whether a push button on the network device 106 is pressed by the user (e.g., a network administrator). The push button may be pressed by the user to configure the network device 106 with a communication network (e.g., to receive an encryption key, a code, etc. at the network device 106 from another network device of the communication network). It is noted that the push button may be a physical or virtual button, or other triggering mechanisms such as a switch. It is also noted that various other user-initiated actions associated with a network configuration technique can cause the network device to receive a code to configure the network device. For example, the configuration unit 109 can detect an input via a user interface (UI) or via other types of input/output devices (e.g., a microphone). If a user-initiated action associated with a network configuration technique is detected at the network device, control flows to block 304. If a user-initiated action is not detected at the network device, control loops back to block 302.

At block 304, a code (i.e., an orthocode) is received at the network device to configure the network device. In one implementation, the network configuration unit 109 may receive the code to configure the network device 106 from another network device in the communication network. For example, the network configuration unit 109 receives the code from the network device 110 which is already configured with the PLC network 112. In other words, the network device 110 (which has already joined the PLC network 112) provides the code associated with the PLC network 112 to the network device 106. In some implementations, a push button is triggered at both the network device 106 and the network device 110 for the network device 110 to send the code to the network device 106. The network configuration unit 109 then stores the received code in a memory to configure the network device 106 with the code, and the flow continues to block 306.

At block 306, a transmission having a reference code that is associated with the code configured in the network device is detected on the shared communication channel. In one implementation, the network configuration unit 109 may detect a network packet of a transmission which includes a reference code that is associated with the code configured in the network device 106 (i.e., the code received at block 304). The network configuration unit 109 can compute a correlation of the reference code in the network packet with the code configured in the network device 106. Based on the correlation, the network configuration unit 109 can determine whether the reference code in the network packet of the transmission is associated with the code configured in the network device 106. When the correlation indicates an association (e.g., the result of correlation is above a pre-defined threshold), the network configuration unit 109 determines that the reference code correlates with the code configured in the network device 106. For example, the network configuration unit 109 can detect a transmission from the network device 107 in the PLC network 112 which has a reference code that correlates with the code configured in the network device 106. The flow continues to block 308.

At block 308, the network device joins the communication network corresponding to the transmission. In one implementation, the network configuration unit 109 of the network device 106 may join the communication network corresponding to the transmission (i.e., the transmission detected at block 306). The network configuration unit 109 may exchange one or more messages with a network device (e.g., a central coordinator) in the PLC network 112 to receive authentication information and join the PLC network 112. For example, the network configuration unit 109 may send a device identifier of the network device 106 to the central coordinator and request for a network key of the PLC network 112 from the central coordinator. In some implementations, the network configuration unit 109 can configure one or more units (e.g., a transmission encoder, a receiving decoder, etc.) in the network device 106 to associate with the PLC network 112. Although the operations described with reference to block 306 include the network configuration unit 109 of the network device 106 detecting transmissions having a reference code associated with the code configured in the network device 106, in some embodiments, after receiving the code at block 304, the network configuration unit 109 may configure the network device 106 to join the PLC network 112 without having to first detect transmissions from the PLC network 112. For example, the network configuration unit 109 may configure the network device 106 to join the PLC network 112 using the code received at block 304 and based on information stored at the network device 106 which indicates that the code received at block 304 corresponds to the PLC network 112. When the network configuration unit 109 configures the network device 106 to join the PLC network 112 without detecting transmissions from the PLC network 112, operations at block 306 may be bypassed and control may flow from block 304 to block 308.

It is noted that the flow diagrams in FIG. 2 and FIG. 3 only depict two techniques to join a communication network via a shared communication channel and other techniques may also be utilized. For example, the network device 106 may include a table having multiple codes stored in the memory of the network device 106. Each of the multiple codes may be associated with a distinct communication network. The network device 106 may utilize a code from the table to determine which communication network to join. For example, the network configuration unit 109 may scan transmissions from multiple communication networks on the communication channel 111. The network configuration unit 109 can then determine whether a code in the transmission is associated with any of the codes stored in the table. In one implementation, the network configuration unit 109 may determine that the reference code in a network packet of the transmission is associated with a code stored in the table by determining a correlation between the reference code and the code stored in the table. For example, when the result of the correlation is above a pre-defined threshold, the network configuration unit 109 may determine that the reference code in the network packet is associated with the code stored in the table. When the network configuration unit 109 determines that the reference code in a network packet of a transmission is associated with a code stored in the table, the network configuration unit 109 can join the communication network corresponding to the transmission.

In some implementations, the network configuration unit 109 may determine that codes which are included in transmissions from more than one communication network are associated with more than one code stored in the table. The network configuration unit 109 may then determine to join one of the communication networks based on encryption information (e.g., network key, etc.) associated with the communication network and the encryption information configured in the network device 106. For example, the network configuration unit 109 may determine that a code in a transmission from a first communication network is associated with a first code stored in the table. The network configuration unit 109 may also determine that a code in a transmission from a second communication network is associated with a second code stored in the table. The network configuration unit 109 can then utilize the encryption information configured in the network device 106 to determine whether to join the first communication network or the second communication network. For example, when the network key configured in the network device 106 corresponds to the network key of the first communication network, the network configuration unit 109 may determine to join the first communication network. Once the network configuration unit 109 determines that the code in the transmission from the first network is associated with the first code stored in the table, the network configuration unit 109 may request for the network key of the first communication network from a network device in the first communication network. On receiving the network key, the network configuration unit 109 can determine that the network key configured in the network device 106 corresponds to the network key of the first communication network, and join the first communication network. Similarly, when the network key configured in the network device 106 corresponds to the network key of the second communication network, the network configuration unit 109 may determine to join the second communication network.

It is also noted that the network device 106 may be a central coordinator in a communication network. For example, a user may determine to setup a communication network using the network device 106, and the network device 106 can act as the central coordinator for the communication network. The network device 106 may also determine a code to be associated with the communication network. In order to determine the code, the network device 106 can scan ongoing transmissions on the communication channel 111 (from existing communication networks which share the communication channel 111), and determine the code based on codes associated with the existing communication networks. For example, the network configuration unit 109 may scan for transmissions from the existing communication networks to identify codes associated with the existing communication networks. The network configuration unit 109 can then determine a code which is orthogonal (i.e., has a weak cross correlation with codes associated with the existing communication networks sharing the communication channel 111). In some embodiments, the network configuration unit 109 may determine that there are no ongoing transmissions from the existing communication networks on the shared communication channel 111. The network configuration unit 109 may then determine the code for the communication network from a table of codes pre-configured in the network device 106. In some embodiments, when the network device 106 acts as the central coordinator for a communication network set up by a user, any network devices that want to join the communication network may communicate with the network device 106 (i.e., the central coordinator) using a network key and request the code associated with the communication network. On receiving the code, the new network device can store the code in its memory and configure itself to join the communication network.

Figure 4:
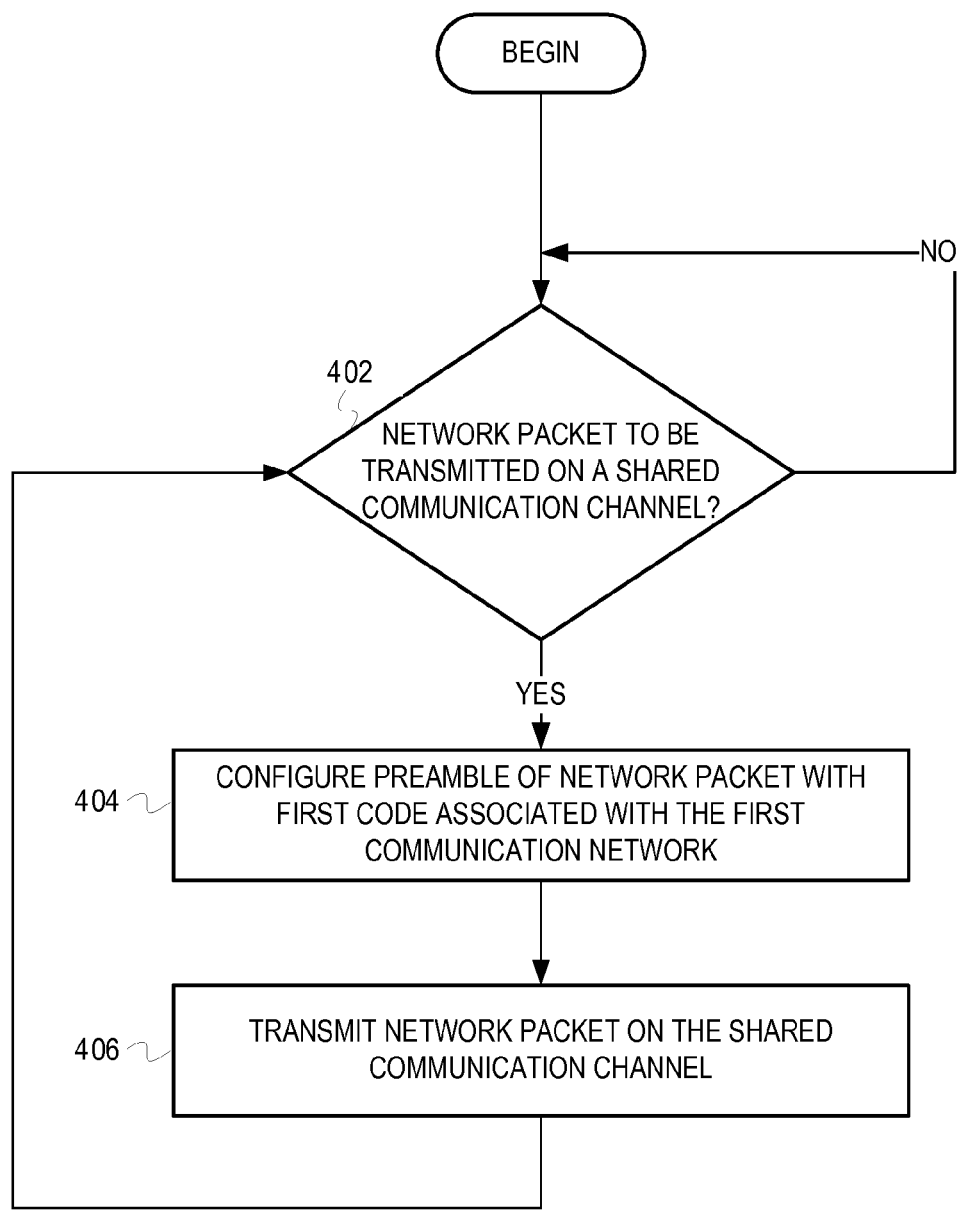
FIG. 4 illustrates a flow diagram of example operations to configure a preamble of a network packet of a first communication network for transmission on a shared communication channel.

FIG. 4 illustrates a flow diagram of example operations to configure a preamble of a network packet of a first communication network for transmission on a shared communication channel.

At block 402, a network device determines whether to transmit a network packet on a shared communication channel. In one implementation, the packet management unit 108 (as described above with reference to FIG. 1) determines whether a network packet should be transmitted on the communication channel 111. For example, the packet management unit 108 may receive a network packet scheduled to be transmitted on the communication channel 111 from one or more processing units in the network device 106. If the packet management unit 108 determines that a network packet is to be transmitted, control flows to block 404. If the packet management unit 108 determines that a network packet is not to be transmitted, control loops back to block 402.

At block 404, a preamble of a network packet is configured with the first code associated with the first communication network. In one implementation, the packet management unit 108 can determine that the network device 106 is configured with the code associated with the PLC network 112. The packet management unit 108 can configure the preamble of the network packet with the code associated with the PLC network 112. For example, the packet management unit 108 reads the code (i.e., the code associated with the PLC network 112) stored in a memory of the network device 106. The packet management unit 108 can configure the preamble of the network packet with the code associated with the PLC network 112. The preamble of the network packet typically includes a phase table for phase synchronization of OFDM carriers. The packet management unit 108 can insert the code in the phase table of the preamble of the network packet that will be transmitted. The code inserted by the packet management unit 108 in the phase table of the preamble of the network packet serves as a reference code for the network packet. The reference code may be utilized by one or more network devices (e.g., the network device 107, the network device 110, etc.) in the PLC network 112 to detect the network packet. The flow continues to block 406.

At block 406, the network packet is transmitted on the shared communication channel. In one implementation, the packet management unit 108 transmits the network packet on the communication channel 111. For example, the packet management unit 108 transmits the network packet having the preamble configured with the code of the PLC network 112 on the communication channel 111. In some implementations, the packet management unit 108 may supply the network packet to one or more units (e.g., a channel encoder, etc.) to transmit the network packet on the communication channel 111. The flow then loops back to block 402 and the packet management unit 108 determines whether another network packet is to be transmitted on the communication channel 111.

Figure 5:
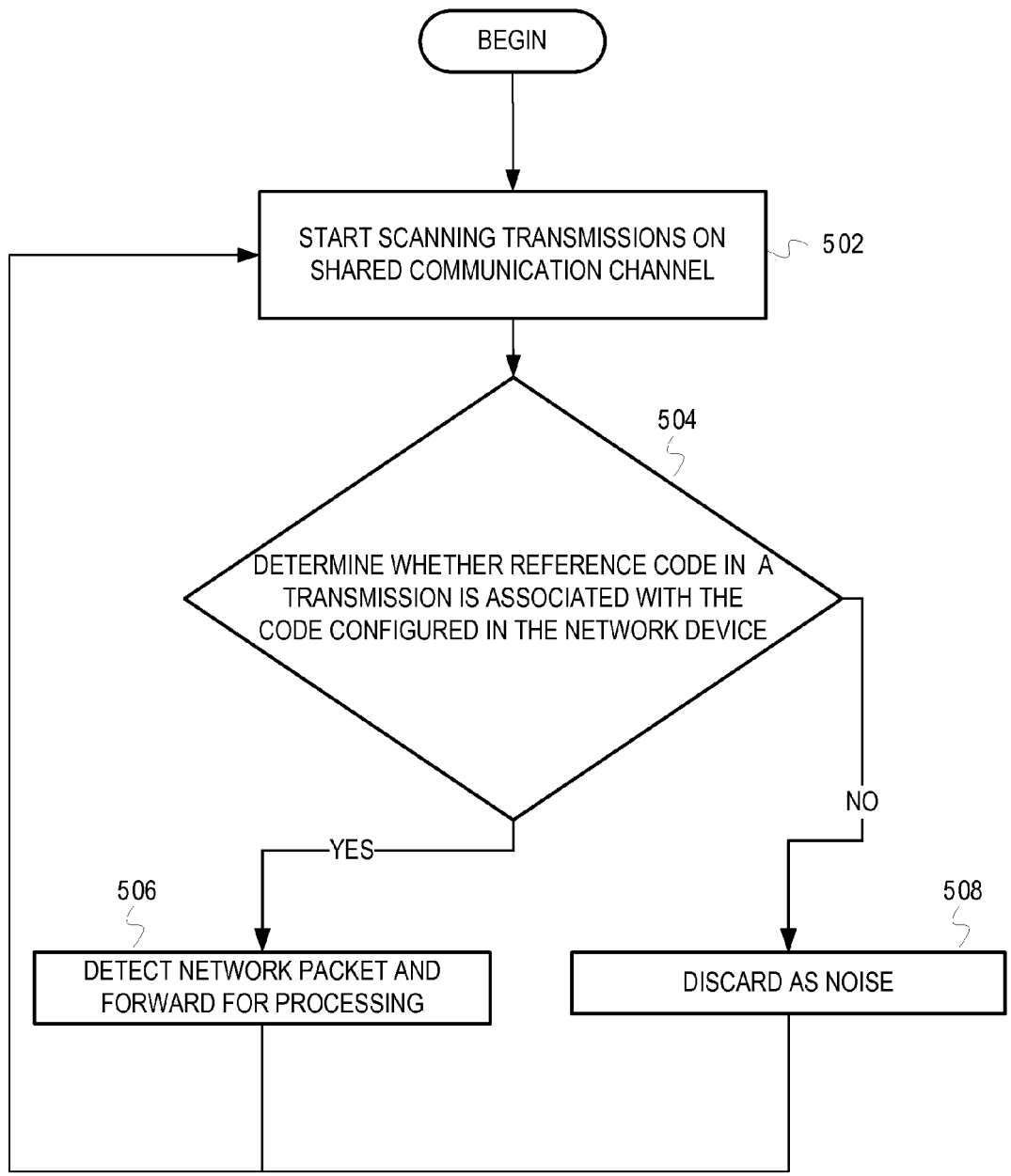
FIG. 5 illustrates a flow diagram of example operations to detect a network packet of a first communication network on a shared communication channel.

FIG. 5 illustrates a flow diagram of example operations to detect a network packet of a first communication network on the shared communication channel.

At block 502, a network device starts scanning of transmissions on a shared communication channel. In one implementation, the packet management unit 108 (as described above with reference to FIG. 1) starts scanning transmissions on the communication channel 111 from other network devices. The network devices transmitting on the communication channel 111 may be network devices associated with different communication networks (e.g., the PLC network 112 and the PLC network 103). The packet management unit 108 can monitor the communication channel 111 and attempt to detect network packets transmitted on the communication channel 111 from other network devices of the PLC network 112. The flow continues to block 504.

At block 504, the network device determines whether the reference code in a transmission is associated with the code configured in the network device. In one implementation, the network device 106 is configured with the code associated with the PLC network 112. The packet management unit 108 can determine whether the reference code in a network packet of the transmission is associated with the code configured in the network device 106. For example, the packet management unit 108 reads the code stored in a memory of the network device and computes a correlation of the reference code in the network packet with the code configured in the network device. When the correlation indicates an association (e.g., the result of correlation is above a pre-defined threshold), the packet management unit 108 may determine that the reference code is associated with the code configured in the network device 106. When the correlation does not indicate an association (e.g., the result of correlation is below a pre-defined threshold), the packet management unit 108 may determine that the reference code is not associated with the code configured in the network device 106. In other implementations, the packet management unit 108 can determine in parallel whether reference codes in more than one network packet are associated with the code configured in the network device 106. For example, the packet management unit 108 can determine whether the reference codes in network packets of transmissions from multiple communication networks are associated with the code configured in the network device 106. The packet management unit 108 may compute correlation of each of the reference codes in the network packets with the code configured in the network device 106 in parallel. Parallel determination of association for reference codes in more than one network packet with the code configured in the network device 106 may allow detection of network packets at higher rates. The packet management unit 108 can detect multiple network packets simultaneously and hence support communication at higher data rates for the network device 106. If the reference code is associated with (e.g., correlates with) the code configured in the network device 106, control flows to block 506. If the reference code is not associated with (e.g., does not correlate with) the code configured in the network device 106, control flows to block 508.

At block 506, the network packet is detected and forwarded for processing. In one implementation, the packet management unit 108 detects the network packet in the transmission and forwards the network packet for processing. For example, the packet management unit 108 can detect the network packet that was transmitted by one of the network devices in the PLC network 112. The packet management unit 108 can then forward the network packet to one or more units (e.g., a packet buffer, a packet processing unit, etc.) in the network device 106 for further processing. The control then loops back to block 502 and the packet management unit 108 can continue scanning transmissions on the communication channel 111.

At block 508, the network packet is discarded as noise. In one implementation, the packet management unit 108 discards the network packet (i.e., the network packet in the transmission at block 502) as noise. For example, the packet management unit 108 may not recognize the network packet as a network packet transmitted by one of the network devices in the PLC network 112. The packet management unit 108 may not forward the network packet for processing when the network packet is not recognized to be transmitted from a network device in the PLC network 112. The packet management unit 108 can discard the network packet as noise and the control then loops back to block 502.

Figure 6:
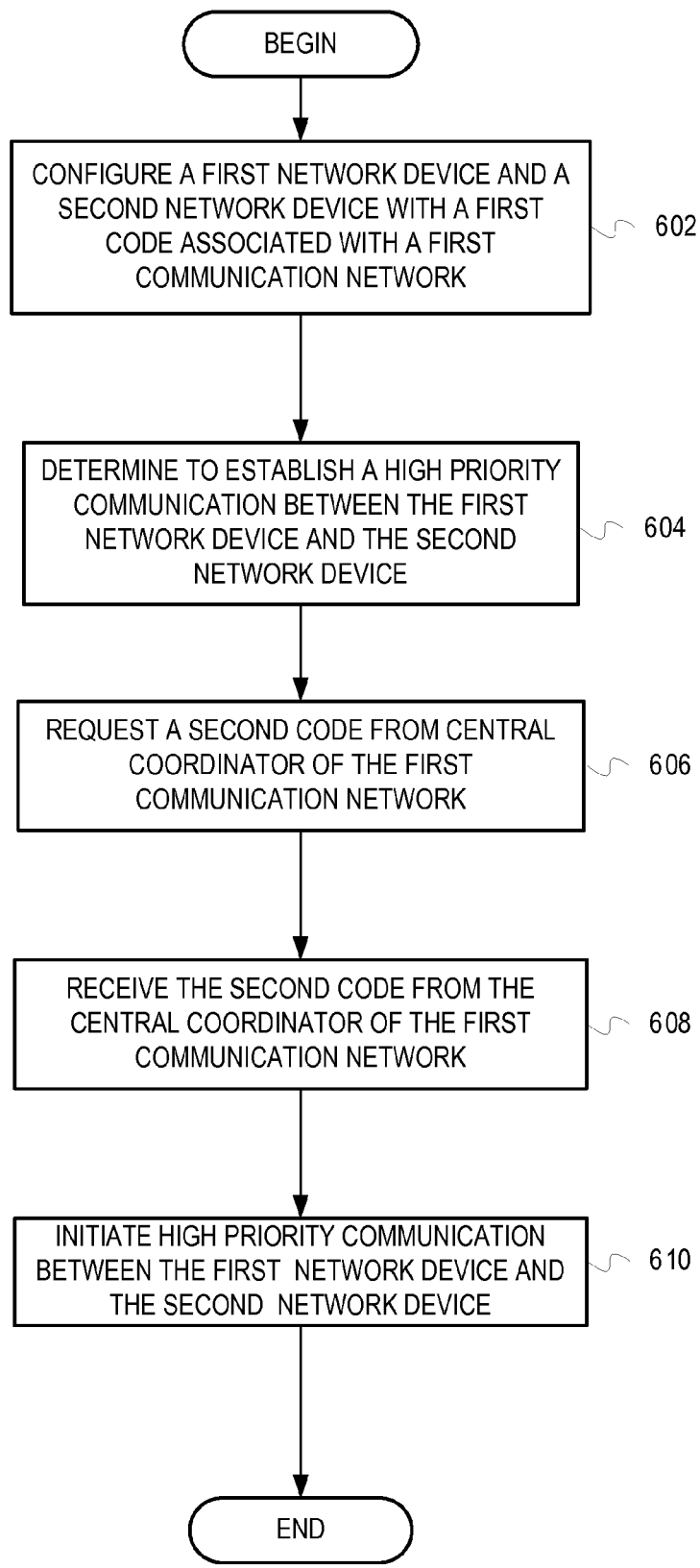
FIG. 6 illustrates a flow diagram of example operations to establish a high priority communication between a first network device and a second network device of a communication network using a shared communication channel.

FIG. 6 illustrates a flow diagram of example operations to establish a high priority communication between a first network device and a second network device of a communication network using a shared communication channel.

At block 602, a first network device and a second network device are configured with a first code associated with a first communication network. In one implementation, the network device 107 and the network device 106 (as described above with reference to FIG. 1) are configured with the code associated with the PLC network 112. For example, the network configuration unit 109 in the network device 106 and a similar network configuration unit in the network device 107 may configure the network devices 106 and 107 with the code associated with the PLC network 112. In one example, the network devices 106 and 107 may receive the code from a central coordinator of the PLC network 112. The flow continues to block 604.

At block 604, the first network device and/or the second network device determine to establish a high priority communication between the devices. In one implementation, the network device 106 (e.g., the network configuration unit 109) may determine to initiate a high priority communication between the network device 106 and 107. In a first example, the network configuration unit 109 may determine to initiate the high priority communication between the network devices 106 and 107 based on a request from one or more components of the network device 106 and/or based on the type of transmission. In a second example, the network configuration unit 109 may determine to initiate the high priority communication between the network devices 106 and 107 based on a message exchange between the network devices 106 and 107. In a third example, the network configuration unit 109 may determine to initiate the high priority communication between the network devices 106 and 107 based on detecting a scheduled high priority transmission or based on a pre-determined communication schedule. For example, the network configuration unit 109 may determine a high definition video communication between the network devices 106 and 107 as a high priority communication. It is noted that the high definition video communication between the network devices 106 and 107 illustrates one example of the high priority communication and other examples are further illustrated below. Similarly, a network configuration unit in the network device 107 may also determine high priority communications between the network devices 106 and 107. The flow continues to block 606.

At block 606, a second code is requested from a central coordinator of the first communication network. In one implementation, the network configuration unit 109 requests the second code from the central coordinator of the PLC network 112. The network configuration unit 109 can request the second code for the high priority communication (determined at block 604) between the network devices 106 and 107. For example, a request for the second code from the network configuration unit 109 may include the type of high priority communication, the device identifiers of the network devices (e.g. media access control (MAC) addresses of the network devices 106 and 107) engaging in high priority communication, etc. In other implementations, the respective network configuration units of the network devices 106 and 107 may separately request the second code and inform the central coordinator about the type of high priority communication (e.g., high definition video communication). The network devices 106 and 107 may form a sub-network (or mini-network) within the PLC network 112 using the second code to exclusively communicate over the communication channel 111. Using the second code the network devices 106 and 107 can accomplish high priority communication without sharing channel bandwidth with other network devices of the PLC network 112. For example, the network devices 106 and 107 can utilize the second code to transmit and receive network packets over the communication channel 111, which would not be detected by network devices configured with the first code. Hence, the second code allows the network devices 106 and 107 to exclusively communicate over the communication channel 111. The flow continues to block 608.

At block 608, a second code is received from the central coordinator of the first communication network. In one implementation, the respective network configuration units in the network devices 106 and 107 receive the second code from the central coordinator of the PLC network 112. The central coordinator may assign the second code to the network devices 106 and 107 based on the code associated with the PLC network 112 and any ongoing transmissions (e.g., transmissions of other communication networks sharing the communication channel 111) on the communication channel 111. For example, the central coordinator may assign the second code to the network devices 106 and 107 such that the second code has a weak cross correlation with the code associated with the PLC network 112 and with other communication networks sharing the communication channel 111. The central coordinator can also keep track of the second code assigned to the network devices 106 and 107 and determine when the high priority communication between the network devices 106 and 107 is finished. When the high priority communication between the network devices 106 and 107 is finished, the central coordinator may re-assign the code associated with the PLC network 112 to the network devices 106 and 107. For example, the network devices 106 and 107 may inform the central coordinator when the high priority communication is finished and request the code associated with the PLC network 112 from the central coordinator. In some implementations, the central coordinator may monitor the high priority communication between the network devices 106 and 107. The central coordinator can detect when the high priority communication is finished, and re-assign the code associated with the PLC network 112 to the network devices 106 and 107. The central coordinator may then assign the second code (that was utilized by network devices 106 and 107) to another group of devices for high priority communication. The flow continues to block 610.

At block 610, a high priority communication between the first network device and the second network device is initiated. In one implementation, the respective network configuration units in the network devices 106 and 107 configure the network devices with the second code (received from the central coordinator at block 608) to initiate the high priority communication. For example, the respective network configuration units in the network devices 106 and 107 can replace the code (i.e., the code associated with the PLC network 112) stored in the memory of network devices 106 and 107 with the second code. It is noted, however, that the network devices 106 and 107 may store both the first code and the second code (instead of replacing the first code). The network devices 106 and 107 can then have the option to switch back to using the first code to communicate with other network devices after they complete the high priority communication.

It is further noted that establishing a high priority communication between network devices of a communication network is not limited to such high priority communication between a pair of network devices in the communication network. The high priority communication may be established between more than two devices (e.g., a group of devices) in the communication network. The group of devices can comprise a sub-network or mini-network within the communication network and can exclusively utilize bandwidth of a shared communication channel (without sharing the bandwidth with network devices outside the sub-network or mini-network).

In one implementation, a high priority communication may be established between network devices based on a class of devices. For example, within the PLC network 112, the network devices 107 and 110 may be a television and a digital video recorder (DVR) respectively, which comprise a first class of devices. When there is a high priority communication between the network devices 107 and 110, the network devices 107 and 110 can request a second code from a central coordinator of the PLC network 112. The second code is different from the code associated with the PLC network 112. The network devices 107 and 110 can receive the second code from the central coordinator of the PLC network 112 and configure themselves to be a part of a mini-network. The network devices 107 and 110 can then utilize the second code to configure network packets for transmission over the communication channel 111. The network devices 107 and 110 can also detect network packets transmitted on the communication channel 111 which have their respective preambles configured with the second code.

In another implementation, a high priority communication between the network devices may be established based on type of communication between the devices. For example, the network device 107 and 110 may have to establish a special type of communication (e.g., video conference, voice chat, etc.). In other examples, the special type of communication may be any type of communication in which data is buffered (e.g., Voice Over Internet Protocol (VOIP), etc.). The network devices 107 and 110 can request a second code from a central coordinator of the PLC network 112 and utilize the second code to configure network packets for transmission over the communication channel 111, as described above. The network devices 107 and 110 can detect network packets transmitted on the communication channel 111 which have their respective preambles configured with the second code. It is noted that although FIGS. 1-6 describe a reference code as being included in a preamble of a network packet of a transmission, the reference code may also be described as being included in a preamble of a data frame of the transmission.

As described above, in some implementations, the network device 106 (and other network devices in the corresponding network) may be pre-configured (e.g., during manufacture) for joining and sending/receiving network packets in a communication network (e.g., a PLC network). In some implementations, the code in the network device 106 and other network devices may be manually configured by a network administrator. For example, the network administrator can modify the code stored in the memory of device 106. In some examples, the network device 106 may store a table of all available codes for that device and the network administrator (or other user) may program the network device 106 to use any one of the available codes. For example, the network device 106 may include a table of codes and the network administrator can program the network device 106 to utilize a particular code in the table for certain time duration or until the network device 106 has been re-programmed. After the network device 106 is programmed, the network device 106 may either initiate a network with the selected code, or scan the transmissions in the communication channel to join a network that uses the selected code. In some embodiments, the central coordinator of a communication network or a network administrator may create a network or sub-network (or mini-network) of network devices that utilizes a code that is orthogonal to a known reference code for a known class of network devices or network devices that implement a known standard. For example, the network devices may be programmed with a code that is orthogonal to a reference code that is used by HomePlug® compatible devices or G.hn compatible devices to minimize interference.

In some embodiments, the packet management unit 108 and the network configuration unit 109 of the network device 106 (e.g., shown in FIG. 1) may allow the network device 106 to switch from the PLC network 112 to the PLC network 103. For example, the network device 106 may switch from the PLC network 112 to the PLC network 103 in order to communicate with the network device 102 of the PLC network 103. In some implementations, the network device 106 may determine the code associated with the PLC network 103 partly based on the encryption information of the PLC network 103. For example, the network device 106 may receive the code associated with the PLC network 103 while receiving network security credentials of the PLC network 103. In other implementations, the network device 106 may include a table of codes stored in the memory of the network device 106. The network device 106 may determine to join a communication network associated with a particular code in the table.

The network device 106 may cycle through each of the ongoing transmissions on the communication channel 111 to find the communication network associated with that particular code. In other embodiments, when switching from the PLC network 112 to the PLC network 103, the network configuration unit 109 may receive the code associated with the PLC network 103 from a central coordinator of the PLC network 112. For example, the central coordinator of the PLC network 112 may maintain topology information of one or more communication networks. The central coordinator may maintain information about MAC address of a network device and the code associated with the communication network of the network device. In some implementations, the central coordinator may learn of topology information from a central coordinator(s) of other communication network(s). For example, the central coordinators of different communication networks can synchronize topology information at regular intervals. In other implementations, the central coordinator may receive topology information from one or more network devices in different communication networks. The network configuration unit 109 may request for the code of the communication network (i.e., the PLC network 103) based on the MAC address of the network device (i.e., the network device 102) from the central coordinator of the PLC network 112. The network configuration unit 109 can then configure the network device 106 with the code associated with the PLC network 103.

Although examples in FIGS. 1-6 refer to enabling channel reuse among communication networks which utilize OFDM, embodiments are not so limited. It is noted that the techniques described in FIGS. 1-6 can be used to enable channel reuse among communication networks which utilize other modulation schemes (e.g., code division multiple access (CDMA)). It is also noted that, in the embodiments described above with reference to FIGS. 1-6, a reference code is also referred to as a code, an orthocode, an orthogonal code, a polyphase code, and combinations of the same. It is further noted that although various embodiments refer to orthogonal codes or the orthogonality of reference codes, the codes may not be perfectly orthogonal. Instead, in some embodiments, although the codes may be referred to as orthocodes or orthogonal codes, the codes may exhibit orthogonal properties or may be quasi-orthogonal.

FIGS. 2, 3, and 5 describe that in some embodiments a correlation between codes (i.e., a reference code and a code configured in a network device) indicates an association when the result of correlation is above a pre-defined threshold, and does not indicate an association when the result of correlation is below a pre-defined threshold. It is noted that in other embodiments multiple thresholds may be utilized to determine the association between the codes, and multiple thresholds may also be utilized to determine that the correlation does not indicate an association.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
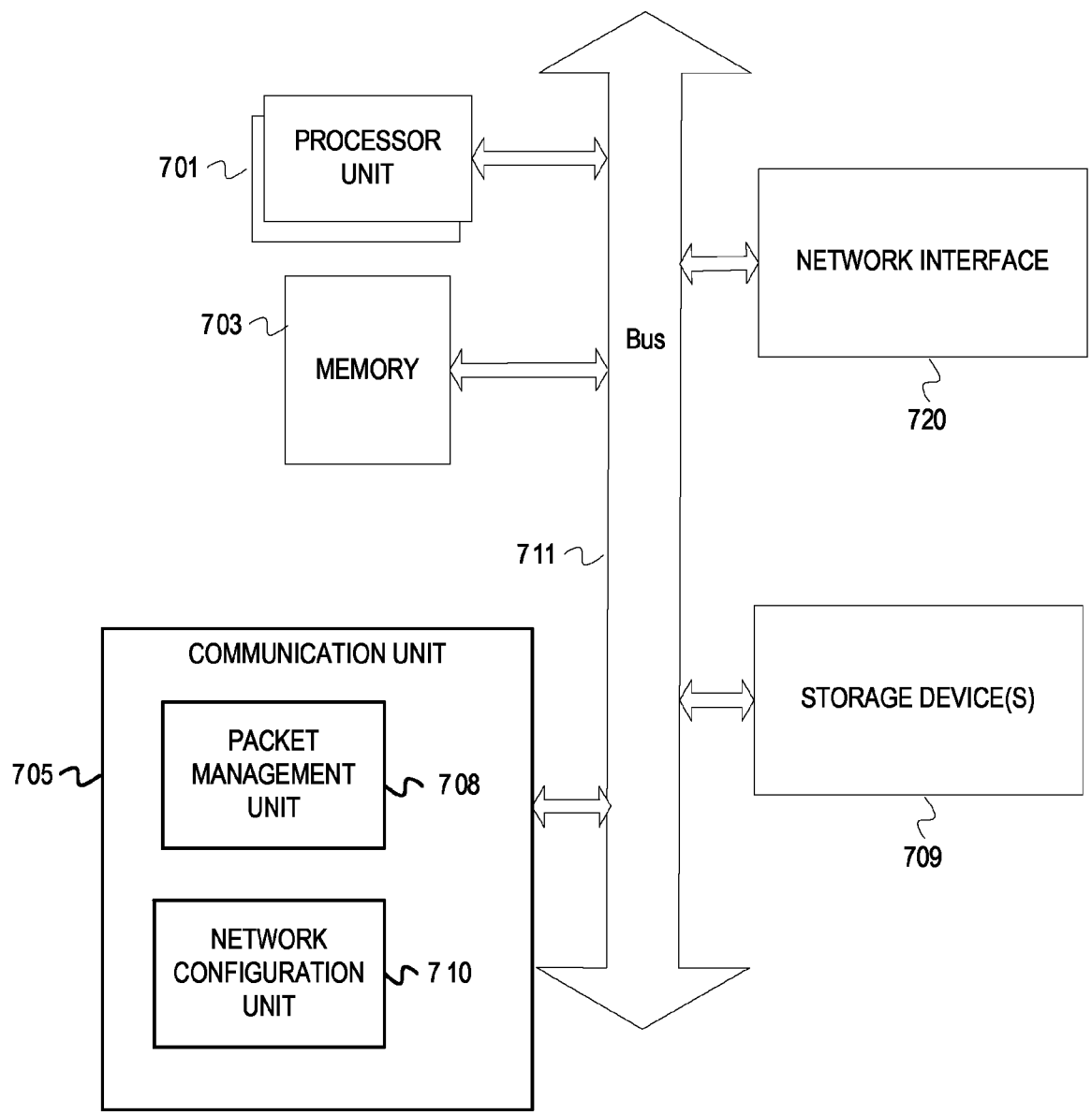
FIG. 7 depicts an example network device.

FIG. 7 depicts an example network device 700. In some implementations, the network device 700 may be a PLC device (e.g., a server, a television, a laptop, etc.). The network device 700 includes a processor unit 701 (possibly including multiple processors, multiple cores, multiple nodes, and/or implementing multi-threading, etc.). The network device 700 includes memory 703. The memory 703 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or one or more of the above already described possible realizations of machine-readable media. The network device 700 also includes a bus 711 (e.g., PCI, PCI-Express, AHB™, AXI™, NoC, etc.), a communication unit 705, and a storage device(s) 709 (e.g., optical storage, magnetic storage, network attached storage, etc.), and a network interface 720 (e.g., a powerline interface, an Ethernet interface, a Frame Relay interface, SONET interface, wireless interface, etc.). The communication unit 705 may include one or more hardware, firmware, and software components to allow communication between the network device 700 and one or more network devices. The communication unit 705 may be partially (or entirely) implemented in one or more integrated circuits (e.g., one or more application specific integrated circuits). The communication unit 705 also includes a packet management unit 708 and a network configuration unit 710. The network configuration unit 710 includes one or more components to facilitate configuring the network device 700 with a communication network via a shared communication channel. The packet management unit 708 includes one or more components to configure a preamble of a network packet for transmission on the shared communication channel, and also to detect a network packet on the shared communication channel, as described above with reference to FIGS. 1-6. One or more of these functionalities may be partially (or entirely) implemented in hardware or an application specific integrated circuit. Further, realizations may include fewer or additional components not illustrated in FIG. 7 (e.g., video cards, audio cards, additional network interfaces, peripheral devices, etc.). The processor unit 701, the storage device(s) 709, the network interface 720, and the communication unit 705 are coupled to the bus 711. Although illustrated as being coupled to the bus 711, the memory 703 may be coupled to the processor unit 701.

While the embodiments are described with reference to various implementations and exploitations, it will be understood that these embodiments are illustrative and that the scope of the inventive subject matter is not limited to them. In general, techniques for enabling channel reuse among communication networks sharing a communication channel as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a first network device, a first correlation between a first reference code included in a first transmission on a communication channel and a second reference code configured in the first network device, wherein the communication channel is shared among a plurality of powerline communication networks, wherein the first reference code is associated with a first powerline communication network of the plurality of powerline communication networks, and the first reference code is orthogonal or quasi-orthogonal to each of a plurality of reference codes associated with others of the plurality of powerline communication networks;
   determining that the first correlation is above a threshold;
   joining, by the first network device, the first powerline communication network in response to determining that the first correlation is above the threshold; and
   communicating with a second network device in the first powerline communication network using the second reference code.

2. The method of claim 1, wherein said communicating with the second network device comprises:
   determining to transmit a first network packet on the communication channel to the second network device;
   configuring a preamble of the first network packet with the second reference code; and
   transmitting the first network packet to the second network device via the communication channel.

3. The method of claim 2, wherein said configuring the preamble of the first network packet comprises inserting the second reference code into the preamble of the first network packet.

4. The method of claim 1, further comprising:
   determining to transmit a first network packet on the communication channel to a plurality of network devices in the first powerline communication network;
   configuring a preamble of the first network packet with the second reference code; and
   transmitting the first network packet to the plurality of network devices via the communication channel.

5. The method of claim 1, wherein said joining the first powerline communication network comprises:
   configuring the first network device with the first reference code;
   exchanging authentication information with the second network device associated with the first powerline communication network; and
   receiving a network key of the first powerline communication network from the second network device.

6. The method of claim 1, wherein the second reference code is received in response to a user-initiated input for network configuration.

7. The method of claim 1, further comprising:
   scanning transmissions on the communication channel after joining the first powerline communication network;
   determining whether one or more transmissions on the communication channel include the first reference code;

detecting a first network packet of the one or more transmissions that includes the first reference code; and processing the first network packet at the first network device.

8. The method of claim 7, wherein said scanning transmissions on the communication channel comprises monitoring the communication channel and attempting to detect network packets transmitted on the communication channel from other network devices of the first powerline communication network that include the first reference code.

9. The method of claim 7, further comprising detecting a second network packet of the one or more transmissions that does not include the first reference code and discarding the second network packet as noise.

10. The method of claim 1, wherein the plurality of powerline communication networks are orthogonal frequency division multiplexing (OFDM) communication networks.

11. A method comprising:

determining, at a first network device, to establish a priority communication between the first network device and a second network device over a communication channel shared with other network devices of a first powerline communication network, wherein the first network device and the second network device are configured with a first reference code associated with the first powerline communication network;

requesting a second reference code from a central coordinator of the first powerline communication network, wherein the second reference code is different than the first reference code;

configuring the first network device with the second reference code in response to receiving the second reference code from the central coordinator; and configuring network packets of the priority communication between the first network device and the second network device with the second reference code, wherein the second reference code is orthogonal or quasi-orthogonal to at least a third reference code associated with the other network devices.

12. The method of claim 11, wherein the priority communication has priority based, at least in part, on the first network device and the second network device being part of a first class of devices.

13. The method of claim 11, wherein the priority communication has priority based, at least in part, on the priority communication being a predefined type of data transmission.

14. The method of claim 11, further comprising the first network device discarding network packets that do not have both the first reference code and the second reference code.

15. A first network device comprising:

a processor;

a network interface;

a machine-readable medium having instructions stored thereon, the instructions executable by the processor to cause the first network device to:

determine a first correlation between a first reference code included in a first transmission on a communication channel and a second reference code configured in the first network device, wherein the communication channel is shared among a plurality of powerline communication networks, wherein the first reference code is associated with a first powerline communication network of the plurality of powerline communication networks, and the first reference code is orthogonal or quasi-orthogonal to each of a plurality of reference codes associated with others of the plurality of powerline communication networks;

determine that the first correlation is above a threshold;

join the first powerline communication network in response to determining the first correlation is above the threshold; and a packet management unit configured to:

communicate with a second network device in the first powerline communication network using the second reference code.

16. The first network device of claim 15, wherein the packet management unit configured to communicate with the second network device using the second reference code comprises the packet management unit configured to:

determine to transmit a first network packet on the communication channel to the second network device;

configure a preamble of the first network packet with the second reference code; and transmit the first network packet to the second network device via the communication channel.

17. The first network device of claim 16, wherein the packet management unit configured to configure the preamble of the first network packet comprises the packet management unit configured to insert the second reference code into the preamble of the first network packet.

18. The first network device of claim 15, wherein the packet management unit is further configured to:

determine to transmit a first network packet on the communication channel to a plurality of network devices in the first powerline communication network;

configure a preamble of the first network packet with the second reference code; and transmit the first network packet to the plurality of network devices via the communication channel.

19. The first network device of claim 15, wherein the instructions to join the first powerline communication network comprises instructions to cause the first network device to:

configure the first network device with the first reference code;

exchange authentication information with the second network device associated with the first powerline communication network; and receive a network key of the first powerline communication network from the second network device.

20. The first network device of claim 15, wherein the packet management unit is further configured to:

scan transmissions on the communication channel after joining the first powerline communication network;

determine whether one or more transmissions on the communication channel include the first reference code;

detect a first network packet of the one or more transmissions that includes the first reference code; and process the first network packet at the first network device.

21. The first network device of claim 20, wherein the packet management unit configured to scan transmissions on the communication channel comprises the packet management unit configured to monitor the communication channel and attempt to detect network packets transmitted on the communication channel from other network devices of the first powerline communication network that include the first reference code.

22. The first network device of claim 20, wherein the instructions further comprise instructions to cause the first network device to detect a second network packet of the one or more transmissions that does not include the first reference code, and the packet management unit configured to discard the second network packet as noise.

23. A non-transitory machine-readable medium having machine executable instructions stored therein, the machine executable instructions comprising instructions to:
- determine, at a first network device, a first correlation between a first reference code included in a first transmission on a communication channel and a second reference code configured in the first network device, wherein the communication channel is shared among a plurality of powerline communication networks, wherein the first reference code is associated with a first powerline communication network of the plurality of powerline communication networks, and the first reference code is orthogonal or quasi-orthogonal to each of a plurality of reference codes associated with others of the plurality of powerline communication networks;
- determine that the first correlation is above a threshold;
- join, by the first network device, the first powerline communication network in response to determining the first correlation is above the threshold; and
- communicate with a second network device in the first powerline communication network using the second reference code.

24. The non-transitory machine-readable medium of claim 23, wherein said instructions to communicate with the second network device comprise instructions to:
- determine to transmit a first network packet on the communication channel to the second network device;
- configure a preamble of the first network packet with the second reference code; and
- transmit the first network packet to the second network device via the communication channel.

25. The non-transitory machine-readable medium of claim 23, wherein the machine executable instructions further comprise instructions to:
- determine to transmit a first network packet on the communication channel to a plurality of network devices in the first powerline communication network;
- configure a preamble of the first network packet with the second reference code; and
- transmit the first network packet to the plurality of network devices via the communication channel.

26. The non-transitory machine-readable medium of claim 23, wherein said instructions to join the first powerline communication network comprise instructions to:
- configure the first network device with the first reference code;
- exchange authentication information with the second network device associated with the first powerline communication network; and
- receive a network key of the first powerline communication network from the second network device.

27. The non-transitory machine-readable medium of claim 23, wherein the machine executable instructions further comprise instructions to:
- scan transmissions on the communication channel after joining the first powerline communication network;
- determine whether one or more transmissions on the communication channel include the first reference code;
- detect a first network packet of the one or more transmissions that includes the first reference code; and
- process the first network packet at the first network device.

28. The method of claim 1, wherein said communicating with the second network device using the second reference code comprises inserting the second reference code into a phase table of a preamble of a network packet and transmitting the network packet to the second network device via the communication channel.

29. The first network device of claim 15, wherein the packet management unit configured to communicate with the second network device using the second reference code comprises the packet management unit configured to insert the second reference code into a phase table of a preamble of a network packet and the first network device to transmit the network packet to the second network device via the communication channel.

30. The non-transitory machine-readable medium of claim 23, wherein said instructions to communicate with the second network device using the second reference code comprises the instructions to insert the second reference code into a phase table of a preamble of a network packet and to transmit the network packet to the second network device via the communication channel.

* * * * *